US009766100B2

(12) United States Patent
Strohbach et al.

(10) Patent No.: US 9,766,100 B2
(45) Date of Patent: Sep. 19, 2017

(54) METHOD AND SYSTEM FOR SPATIO-TEMPORAL SENSOR SELECTION

(71) Applicant: AGT INTERNATIONAL GMBH, Zurich (CH)

(72) Inventors: Martin Strohbach, Hirschberg (DE); Ashok-Kumar Chandra-Sekaran, Karlsruhe (DE); Marco Huber, Weinheim (DE)

(73) Assignee: AGT INTERNATIONAL GMBH, Zurich (CH)

( * ) Notice: Subject to any disclaimer, the term of this patent is extended or adjusted under 35 U.S.C. 154(b) by 579 days.

(21) Appl. No.: 14/358,631

(22) PCT Filed: Nov. 12, 2012

(86) PCT No.: PCT/EP2012/072409
§ 371 (c)(1),
(2) Date: May 15, 2014

(87) PCT Pub. No.: WO2013/072282
PCT Pub. Date: May 23, 2013

(65) Prior Publication Data
US 2014/0316736 A1 Oct. 23, 2014

(30) Foreign Application Priority Data
Nov. 16, 2011 (EP) .................................. 11189417

(51) Int. Cl.
*G06F 19/00* (2011.01)
*G01D 11/00* (2006.01)
(Continued)

(52) U.S. Cl.
CPC .............. *G01D 11/00* (2013.01); *H04L 67/12* (2013.01); *H04W 84/18* (2013.01)

(58) Field of Classification Search
CPC ..................... G06F 3/011; G06F 3/013; G05B 2219/23258
(Continued)

(56) References Cited

U.S. PATENT DOCUMENTS

2011/0037888 A1* 2/2011 Onuki .................... G02B 7/346
348/340

OTHER PUBLICATIONS

Deshpande C. et al.: Model-Driven Data Acquisition in Sensor Networks, In Proceedings of the 30th Very Large Data base Conference (VLDB 2004) Toronto, Canada, Aug. 2004.
(Continued)

*Primary Examiner* — Edward Raymond
(74) *Attorney, Agent, or Firm* — Browdy and Neimark, PLLC

(57) ABSTRACT

A computer implemented method, computer program product and computer system for sensor selection. The computer system can run the computer program to execute the method by dividing a two-dimensional area into cells, wherein the cells are arranged in a grid; receiving a selection trigger for a subset of cells of the grid, wherein at least one cell of the subset has at least one sensor and the at least one cell has a sampling frequency associated; determining a set of constraints for the at least one sensor; selecting the at least one sensor if the at least one sensor complies with the set of constraints; and calculating a sampling frequency of the at least one sensor dependent on the sampling frequency of the at least one cell.

15 Claims, 6 Drawing Sheets

(51) Int. Cl.
*H04L 29/08* (2006.01)
*H04W 84/18* (2009.01)

(58) Field of Classification Search
USPC .......................................... 702/127, 182–185
See application file for complete search history.

(56) References Cited

OTHER PUBLICATIONS

Mourikis A and Roumeliotis S.I.: "Optimal Sensor Scheduling for Resource-Constrained Localization of Mobile Robot Formations", in IEEE Transactions on Robotics 22(5), Oct. 2006, pp. 917-931.
Santini S.: "Adaptive Sensor Selection Algorithms for Wireless Sensor Networks", PhD thesis, ETH Zurich, Switzerland, 2009.
Anastasi G et al.: "Energy conservation in wireless sensor networks: A survey", Ad Hoc Network, Elsevier, vol. 7, No. 3, May 1, 2009, pp. 537-568, XP 026185309, ISSN: 1570-7805, DOI: 10.1016/J.ADHOC.2008.06.003 [retrieved on Jul. 29, 2008].

European Search Report from EP Application No. 11189417 dated Feb. 28, 2012.
Harrington B et al.: "Energy-Efficient Map Interpolation for Sensor Fields Using Kriging", IEEE Transactions on Mobile Computing, IEE Service center, Los Alamitos, CA, US, vol. 8, No. 5, May 1, 2009, pager 622-635, XP011335350, ISSN: 1536-1233, DOI: 10.1109/TMC.2008.167.
International Search Report together with Written Opinion from International Application No. PCT/EP2012/072409 dated Jan. 14, 2013.
Jing Zhou et al.: "FloodNet: Coupling Adaptive Sampling with Energy Aware Routing in a Flood warning System", Journal of Computer Science and Technology, Kluwer Academic Publishers Bo, vol. 22, No. 1. Feb. 14, 2007. pp. 121-130, XP019485538, ISSN: 1860-4749, DOI: 10.1007/S11390-007-9017-7.
Mahawaththa M D W S et al.: "Location aware queries for sensor network", Advance in ICT for Emerging regions (ICTER) 2011 International Conference on, IEEE. Sep. 1, 2011, pager 2-8, XP031990376. DOI: 10.1109/ICTER.2011.6075018. ISBN: 978-1-4577-1113-8.

\* cited by examiner

FIG. 2

| sensor | cell |
|---|---|
| S1 | 2004 |
| S2 | 2001 |
| S3 | 2004 |
| S4 | 2004 |
| S5 | 2002 |
| S6 | 2005 |
| S7 | 2004 |
| S8 | 2005 |
| S9 | 2003 |

3000 at t0 update

| sensor | cell |
|---|---|
| S1 | 2004 |
| S2 | 2001 |
| S3 | 2004 |
| S4 | 2004 |
| S5 | 2002 |
| S6 | 2005 |
| S7 | 2005 |
| S8 | 2005 |
| S9 | 2003 |

3000 at t1

2100 park cells    2200 street cells

METHOD AND SYSTEM FOR SPATIO-TEMPORAL SENSOR SELECTION

This application is a National Phase Application of PCT International Application No. PCT/EP2012/072409, International Filing Date Nov. 12, 2012, claiming priority of EP Patent Application No. 11189417.6, filed Nov. 16, 2011, both of which are hereby incorporated by reference.

TECHNICAL FIELD

The present invention generally relates to electronic data processing, and more particularly, relates to methods, computer program products and systems for sensor selection.

BACKGROUND

In more and more applications "real world" sensor data is used for example, for analytics functions and situational awareness issues. Sensor selection in wireless networks or in participatory sensing scenarios with mobile sensor nodes is often associated with challenges in selecting a subset of relevant sensor nodes at a specific time in order to save energy and communication bandwidth. In participatory sensing the sensor selection problem can be similar to that of wireless sensor networks in general. Additionally, participatory sensing may consider human mobility, which is not directly controllable.

Some approaches for temporal selection use prediction models in which a sensor value is only sent if it deviates from the predicted value more than a given threshold. Other approaches set sampling frequencies of nodes in order to save energy by setting fixed sampling frequencies (duty cycles) on all deployed sensor nodes and coordinating the nodes in order to minimize the delay of an event detection. For spatial selection, sensor nodes may be selected to cover a region of interest in a grid structure. Other approaches select sensor nodes both spatially and temporally based on statistical models about an observed phenomenon.

One issue in the above mentioned approaches is that selecting a minimal subset of nodes to cover the whole deployment region and only change this subset after a predefined time period to avoid energy depletion does not scale well with mobile nodes as the minimal coverage subset changes constantly. In addition, coverage-based selection is not practical for sensors and applications in which a natural coverage range for sensor cannot be specified (e.g. accurate measurements of air pollutants).

An issue of coverage oriented spatial selection is that it is hard to apply to sensors for which a coverage area is not naturally given. For instance a carbon-dioxide sensor provides a point measurement with a zero coverage radius. Setting an artificial coverage radius would therefore introduce further uncertainty that is counterproductive for accurately reconstructing the observed phenomenon.

It is therefore a need to improve spatial and temporal selection of sensor nodes.

SUMMARY

This need is reflected in acquiring data from a large set of sensor nodes in which a significant subset of nodes are wireless and autonomously mobile, which implies that it is difficult to reliably control their position. Examples are sensors attached to people or cars. Ideally an application would like to reconstruct an actual, continuous phenomenon observed by the sensors as accurate as possible. However, by nature sensors provide spatio-temporal discrete samplings of data. The observed phenomenon needs then to be reconstructed based on such discrete sampled sensor data. It is therefore desirable to have a high spatio-temporal resolution of sensor data but at the same time have a scalable solution for handling large numbers of sensor nodes with appropriate computational effort.

Embodiments of the invention allow applications, which require the input of sensor data, to select a relevant sub-set of sensor nodes both in space and time and still maintain an accurate reconstruction of the observed phenomenon. The approach includes dividing a region of interest in a grid of cells for which a sampling frequency can be specified. The grid may be adaptable and allow for an irregular grid structure. The solution allows to efficiently track mobile nodes in the grid and to select only a subset of nodes that collectively provides a specified sampling frequency required by the application. The selection may take various constraints into account, such as for example the energy budget of sensor nodes. For example, wireless sensor networks typically operate on batteries which cannot be replaced too often. Therefore the energy budget of sensor nodes in such sensor networks can impose constraints on the sampling and communication rate of sensor nodes. In this context a problem is to find the right tradeoff between accuracy and energy consumption. In addition large scale, e.g. city-wide, deployments may generate so much data that it can be difficult to process the data in a timely fashion. It is therefore beneficial to reduce the data without compromising the required accuracy. An application may impose a sensor number constraint requiring a minimum of a certain number of sensors or a certain percentage of available sensor nodes to participate in a sensing task. Finally, another constraint can be the actual bandwidth that can be used for sending sensor measurements.

Other constraints are described in the detailed description of the various embodiments of the invention.

In one aspect of the invention a computer implemented method is including: dividing a two-dimensional area into cells, wherein the cells are arranged in a grid; receiving a selection trigger for a subset of cells of the grid, wherein at least one cell of the subset has at least one sensor and the at least one cell has a sampling frequency associated; determining a set of constraints for the at least one sensor; selecting the at least one sensor if the at least one sensor complies with the set of constraints; and calculating a sampling frequency of the at least one sensor dependent on the sampling frequency of the at least one cell.

Other aspects of the invention are a computer program product which is able to execute the above method when run on a computer system and the computer system itself which is configured to run the computer program for executing the method.

For example, a computer system according to one embodiment of the invention may include a grid management component, which is configured to divide a two-dimensional area into cells and to associate at least one cell of the grid with a sampling frequency. A sensor selection component of the computer system may be configured to determine a set of constraints for at least one sensor wherein the at least one sensor is assigned to the at least one cell. The sensor selection component is further configured to select the at least one sensor in response to a selection trigger if the at least one sensor complies with the set of constraints. Further, a data processing component is configured to launch the selection trigger if trigger conditions are fulfilled and to calculate a sampling frequency for the at least one sensor dependent on the sampling frequency of the at least one cell.

Embodiments of the invention support mobile scenarios. Spatio-temporal sensor selection is based on the grid structure and cell sampling frequencies associated with the cells. It can be used, for example, to extend battery life time of the sensor nodes. A selection trigger for reselection of sensor nodes can occur when a mobile sensor node moves out or into a cell of the grid, when the grid structure changes or when associated cell sampling frequencies are changed, e.g., by an application which is requesting a sensing task for collecting measurement data for a given phenomenon.

Inside a cell, sensor nodes can be selected temporally based on a sampling frequency associated with the cell. If no frequency is specified, nodes autonomously or cooperatively may choose when measurements are sent. During temporal selection a subset of nodes may be selected based on context information like constraints, such as for example the remaining energy budget of the sensor, its mobility, communication properties of the network, a constraint on the number of selected sensors or further spatial constraints.

Other advantageous embodiments are laid out in the dependent claims. For example, the number of cells and their sizes may be adapted over time to obtain a better spatial resolution.

The above aspects of the invention combine spatial and temporal selection in a way, which does not rely on models about observed phenomena. Further, they are well suited for mobile sensor nodes. Using the known approaches for solving the above problem would lead to an extensive use of prediction models for both, the temporal and spatial domain of sensor selection. For example, addressing mobility would use prediction models about the sensor nodes trajectories. However, it may be unrealistic to get accurate movement models. Further, the use of prediction models is computationally expensive. The claimed embodiments of the invention are computationally less expensive than model based approaches known from the prior art.

Embodiments of the invention may be used for any application in which it is impractical or inefficient to retrieve sensor data from all sensor nodes at all times although the application prefers to get all the measurements. In particular this may be useful in participatory/environmental sensing application scenarios in which large numbers of people are given mobile sensor nodes to acquire environmental data such as air pollutants and other data. But it can also be extended to any other sensor network application, such as cooperative exploration for a network of autonomous mobile sensors. Autonomous mobile sensors are often called robots. Other examples for sensor network applications are habitat monitoring and structural health monitoring.

BRIEF DESCRIPTION OF THE DRAWINGS

FIG. 2 is an example of a mapping structure according to one embodiment of the invention;

DETAILED DESCRIPTION

Figure 1:
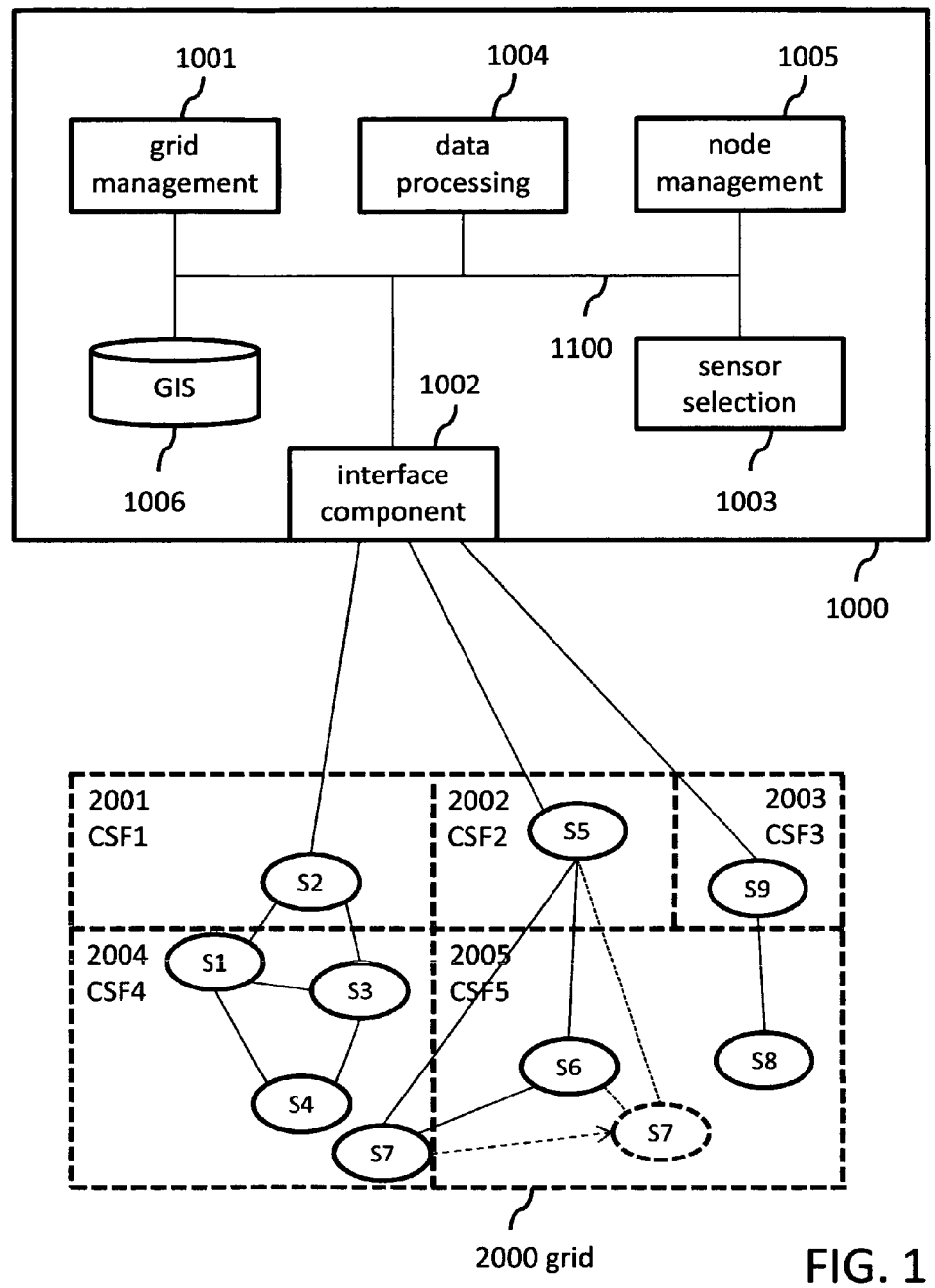
FIG. 1 is a simplified computer system according to one embodiment of the invention interacting with sensor networks.

FIG. 1 is a simplified computer system 1000 according to one embodiment of the invention. The computer system 1000 may include a grid management component 1001, an interface component 1002, a sensor selection component 1003 and a data processing component. Further components can be a node management component 1005 and an extended Global Information System (GIS) component 1006. The various components of the computer system 1000 can communicate via a communication infrastructure 1100, such as a system bus or may also communicate directly with each other through appropriate interfaces. Communication to devices or components outside the system 1000 is advantageously done through the interface component 1002, which is configured to manage incoming data and provides an interface for accessing the data.

Incoming data may be stored in a database, such as triple store, which is a purpose-built database for the storage and retrieval of Resource Description Framework (RDF) metadata and which is therefore appropriate to persist semantic data. Incoming data may also be stored in a database. NoSQL databases belong to a broad class of database management systems that differ from the classic model of the relational database management system (RDBMS). These data stores may not require fixed table schemas, usually avoid join operations, and typically scale horizontally.

However, incoming data do not necessarily need to be stored. For example, event data may be directly processed by a complex event processing engine, which can be part of the data processing component 1004. In alternative embodiments, each of the system components may implement its own external interface and communicate directly with external devices or components.

The computer system 1000 is configured to use and control sensor networks for collecting sensor data, for example, to support certain measurements. For example, measurement phenomena of interest may be carbon-dioxide concentration in urban areas, particulate matter, humidity or ultra-violet radiation. Corresponding sensors may be used to collect the respective measurement data. That is, a measurement phenomenon corresponds to specific physical measurement data. Sensors may also provide further physical data like speed or distance to describe logical or indirect measurement phenomena such as traffic density or crowd behavior.

In FIG. 1 three sensor networks are shown. The first sensor network includes the sensors S1 to S4. The second sensor network has the sensors S5 to S7 and the third sensor network includes sensors S8 and S9. A sensor network is defined as a collection of at least one sensor node and has at least one gateway. In the example, the first, second and third sensor networks have the gateways S2, S5 and S9, respectively. A gateway can communicate with each sensor of the respective sensor network, either directly or indirectly via other sensor nodes of the sensor network. It is also possible that a sensor belongs to multiple sensor networks and can then communicate with multiple gateways. A gateway does not need to be a sensor on its own but can simply be a node used for communication purposes. A gateway may use wireless communication standards, such as for example, ZigBee, IEEE 802.15.4 or 6lowPAN. The gateways are communication interfaces also used to establish communication between the computer system 1000, for example through the interface component 1002, and the respective sensor network. A gateway can be a wireless sensor node used for communication, a PC, a mobile phone or any other dedicated piece of hardware, which is appropriate for routing communication between the computer system and the sensor network. The sensor nodes S1 to S9 of the sensor networks can be devices containing at least one physical sensor and being communicatively coupled with at least one gateway. The coupling can be established using wireless communication standards (e.g., WLAN, Bluetooth, etc.), wired communication standards (e.g, LAN, Ethernet) or through physical integration with the gateway itself using a kind of internal bus communication. A sensor node may be able to determine its position, e.g., through a global positioning system (GPS) sensor, and may send its measurement values with accurate location information to the respective gateway.

Figure 3:
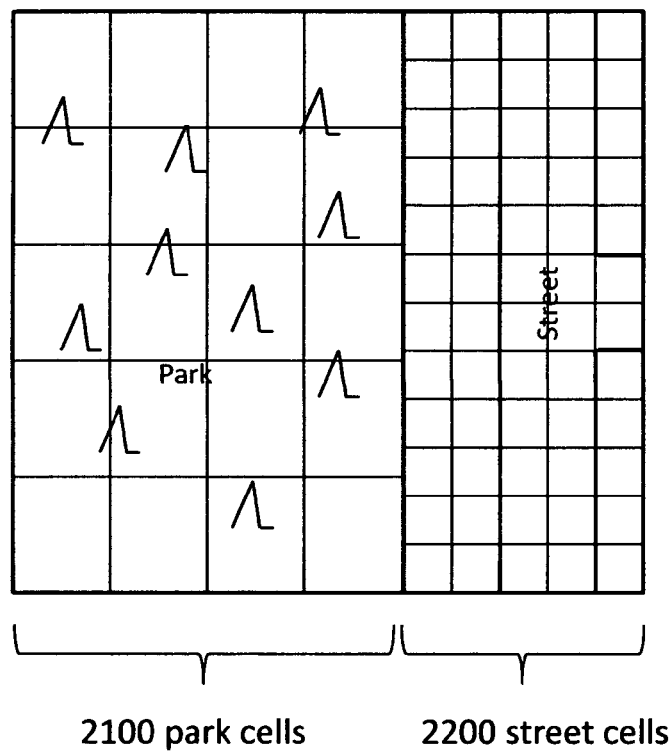
FIG. 3 shows an example of a possible grid configuration according to one embodiment of the invention.

The grid management component 1001 manages a virtual grid 2000, which includes a plurality of cells 2001 to 2005. The cells may be of different size resulting in an irregular grid structure. For example, cell 2003 is smaller than cell 2002, which again is smaller than cell 2002. The entire grid 2000 corresponds to a two-dimensional area. A geographic information system (GIS) may be coupled to the grid management component 1001 to provide geographic information such as spatial models like for example two-dimensional maps of the area which is covered by the sensor networks. In other words, the grid management component can divide a two-dimensional area into cells 2001 to 2005 of the grid 2000. A simplified example of an irregular grid in combination with street map information from a GIS system is shown in FIG. 3. In this example, the grid cells covering a street area are smaller than the grid cells covering a park area, which is located next to the street. Thus, a virtual segmentation of the area covered by the sensor networks is achieved. Thereby, a grid cell can cover parts of one sensor network (e.g., cell 2003) or multiple sensor networks (e.g., cell 2004). On the other hand a sensor network can span multiple cells. In case the grid structure changes over time, the grid management component can launch a grid structure update event to notify the system 1000 of the change.

The grid management component further can store sampling frequency assignments for the cells of the grid 2000. For example, in FIG. 1 each cell 2001 to 2005 has a sampling frequency CSF1 to CSF5 associated with the respective cell. The cell sampling frequencies can be used in specific measurements to manage the sampling rates for sensor data originating in the respective cell. For example, there can be different sampling frequencies associated with different measurement phenomena for the same cell. This enables the grid management component to manage a "region to frequency mapping" per phenomenon, that is, for each region of the two-dimensional area, which is covered by a cell of the grid 2000; a specific sampling frequency can be assigned for a specific phenomenon. Typically an application will define such a sampling frequency based on its needs in terms of how often it needs measurement data updates for its application purpose.

The sampling frequency mapping can define how many samples per time unit are required for this region for a given measurement phenomenon. For example, the cell sampling frequencies can be set by external systems or applications, e.g. obtained from machine learning algorithms (data processing), manually as a result of experiments or dynamically determined by prediction models (e.g. S. Santini. "Adaptive Sensor Selection Algorithms for Wireless Sensor Networks." PhD thesis, ETH Zurich, Switzerland, 2009). In case a cell frequency changes over time, the grid management component can launch a grid sampling frequency update event to notify the system 1000 of the change.

Although the grid management component 1001 is configured to associate the cells of the grid with sampling frequencies, not each cell of the grid needs to have a sampling frequency associated. For example, if an application may only be interested to receive changes above a certain threshold and instruct the system 1000 to decide which nodes monitor that change, the respective cells may not have a sampling frequency associated. In this case alternatively, as explained above, prediction models and models of real-world processes (cf. A. Deshpande, C. Guestrin, S. R. Madden, J. M. Hellerstein, and W. Hong. Model-Driven Data Acquisition in Sensor Networks. In Proceedings of the 30th Very Large Data Base Conference (VLDB 2004), Toronto, Canada, August 2004) can be used to determine a cell sampling frequency. In case of known trajectories, a scheme as described by Mourikis (A. Mourikis and S. I. Roumeliotis. "Optimal Sensor Scheduling for Resource-Constrained Localization of Mobile Robot Formations." In IEEE Transactions on Robotics, 22(5), October 2006, pp. 917-931) can be adopted to obtain a cell sampling frequency in a cell.

If certain cells are not relevant for certain measurement phenomena, the respective cells may have a sampling frequency with a value of zero. For example, if a $CO_2$ measurement for an urban sector is targeting to get information about vehicle caused pollution, sensors which are in the interior of buildings may not be able to contribute any meaningful values. Therefore, cells which cover areas that correspond to the interior of buildings may be associated with sampling frequencies of zero indicating that none of the respective sensors located inside those cells needs to contribute any measurement data.

The system 1000 may also be configured to perform a location management function. The location management function can also be an independent component or be performed by other components of the system, such as for example the grid management component 1001, the node management component 1005 or the data processing component 1004. The location management function is configured to keep a mapping structure 3000 (cf. FIG. 2) for defining a mapping between the sensors of the various sensor networks and their respective cell locations. That is, the mapping structure 3000 includes for example an assignment table where the current location of each sensor is assigned to the respective cell in the grid 2000 at a given point in time t0. The current locations of the sensors can be communicated through the respective gateways from the sensors to the system 1000. As mentioned before, sensors may have an integrated GPS function to measure their own location. In other words, the system 1000 knows at any time which sensor is currently assigned to which cell. For example, in the case of mobile sensors the location management function updates the respective assignments in the mapping structure if a mobile sensor S7 changes its position and moves into an area associated with another cell 2005. The location change is reported to the system 1000 through the interface 1002 and may be evaluated, for example, by the data processing component 1004. Finally the mapping structure 3000 is updated accordingly. In such a case the location management function can trigger a sensor location update event to notify the system of the change. The location management function may be executed by one or more location servers. For example, each location server can manage a specific sub-region of the grid 2000 (e.g., a cluster of cells 2001, 2004).

The data processing component 1004 is configured to process any raw data, which is received through the interface component, and also any data provided by any of the other components of the computer system 1000. For example, it may learn about new requirements for sampling frequencies of cells and send respective updates to the grid management component 1001. It may provide sensing tasks by defining which phenomenon in which region is of interest and provides results to a data consumer.

The sensor selection component 1003 is configured to select the appropriate sensors of the sensor networks for participation in specific sensing tasks. For example a sensing task could be to provide a regular update of a certain urban area with regards to the measurement phenomenon carbon-dioxide concentration. Another sensing task could be to measure each day during three predefined time slots the measurement phenomenon of particulate matter in a neighborhood close to a highway. For example, the sensor selection component 1003 can configure sensor update rates based on their location and the current grid structure. The sensor selection component may be triggered by a trigger event, which will also be referred to as selection trigger hereinafter. A selection trigger can be a sensor location update event indicating that a sensor has moved from one location to another. It can further be a grid structure update event indicating that the cell size or the number of grid cells has changed. Further, it may correspond to a grid sampling frequency update event indicating that the sampling frequency for specific grid cells has been changed. A request to change the cell sampling frequency typically is initiated by the application interested in the measurement phenomenon. In another embodiment a selection trigger may be a sensor constraint update event indicating that either a sensor value has changed so that it does not fall anymore within the constraint condition or that the constraint condition itself has changed.

Another influencing parameter for the sensor selection can be the energy budget of a sensor node. The node management component 1005 may also implement functions to handle constraints, for example, for energy management, which can be used to keep an estimate of each sensor's remaining energy budget, and which may also be considered to assess whether a certain sensor is suitable for participating in a given sensing task.

Other constraints influencing sensor selection may be related to the sensor node context, e.g., the node mobility, node location or communication properties of the network. For instance a mobility constraint can be taken into account by preferring certain mobile nodes over stationary nodes. A network communication constraint can be reflected in that the channel capacity of different networks can be compared to decide the maximum number of nodes in a network. Using location as further constraint allows for more detailed spatial selection.

FIG. 2 is an example of a mapping structure 3000 according to one embodiment of the invention. The mapping structure may store relationship information with regards to sensors and cells of the grid 2000. For example, there can be a data set for each sensor S1 to S9 indicating the current location of the sensor with regards to the grid cells. The mapping structure 3000 is shown at two different points in time t0 and t1. In the example, at a first time t0 sensor S1 belong to cell 2004. Sensor S7 also belongs to cell 2004. At a second time t1 sensor S7 obviously moved to a location which is now covered by cell 2005 whereas sensor S1 is still in cell 2004. The mapping structure 3000 is updated accordingly to reflect the change at t1. The location management function may now trigger a sensor location update event to notify the system 1000 (cf. FIG. 1) of the change as sensor S7 is now not available any more in cell 2004 which may have impact on the cell to participate in certain sensing tasks. Of course a similar impact exists with regards to the cell 2005, which may now have a new sensor associated with new capabilities.

FIG. 3 shows an example of a possible grid 2000 configuration for an air pollution application. A geographic area includes a street area on the right side and a park area on the left side. Each grid cell is visualized as a rectangle in the drawing. The average cell size of the street cells 2200 for covering the street area is smaller than the average cell size of the park cells 2100 for covering the park area. That is, the spatial resolution for the street area is high compared to the park area. The cell frequencies in the street area may also be higher than in the park area because cars driving along the street may cause a continuous change in air pollutants which is supposed to be measured more frequently than the respective levels in the park area with fewer expected changes. For example, know models about air flow may be used to further optimize the grid structure. For instance, the configuration in FIG. 3 may work well if winds blow in the same direction as the street because pollutants would not leave the area with a higher spatial and time resolution. However, if the winds blow orthogonal to the street direction, all of a sudden there may be continuous pollution changes in the park area. This could trigger a reconfiguration of the cell sizes and cell sampling frequencies of the park cells 2100 for the affected park area to improve the sensor values collected for the affected areas.

Figure 4:
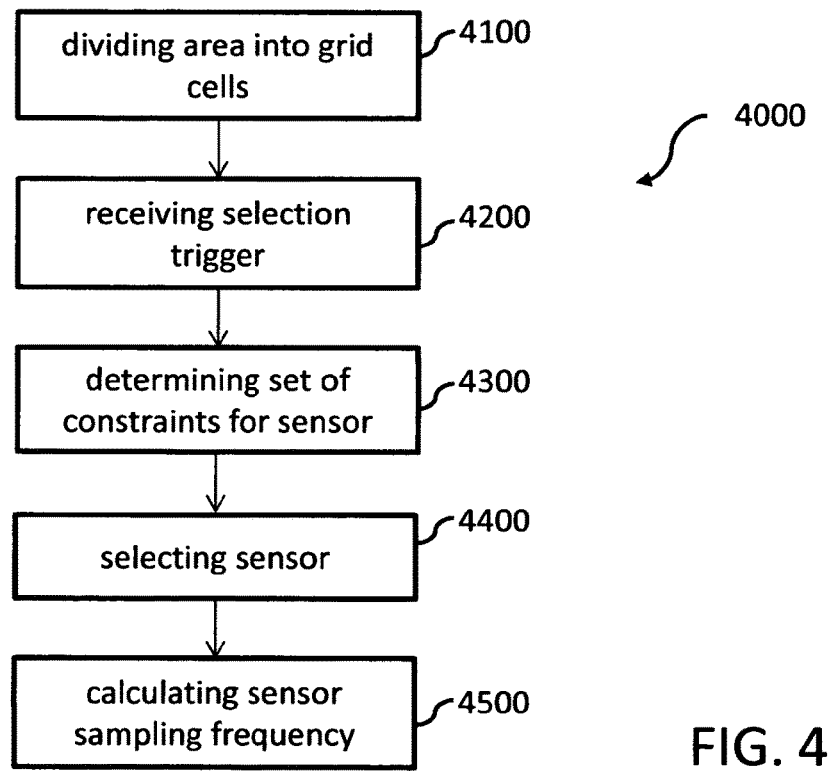
FIG. 4 is a simplified flow chart of a computer implemented method according to one embodiment of the invention.

FIG. 4 is a simplified flow chart of a computer implemented method 4000 according to one embodiment of the invention, which can be executed by the computer system as described under FIG. 1. The computer implemented method 4000 may include dividing 4100 a two-dimensional area into cells 2001 to 2009, wherein the cells are arranged in a grid 2000. As described under FIG. 1, GIS information may be used for defining the grid coverage through respective cells of certain areas. For example, an area which is covered by a building may be defined as a corresponding grid cell. FIG. 3 shows a further example of a grid structure. In FIG. 3 the grid is an irregular grid. However, also regular grids may be used for an equidistant grid cell definition. An application may now be interested to use sensor data originating in one or more cells of the grid and send a corresponding sensor data request, which will function as a selection trigger for a subset of cells of the grid once received by the computer system. Other selection triggers may be launched if a corresponding trigger condition is fulfilled. The following examples describe specific selection triggers together with a possible trigger condition: sensor location update events in case that a sensor moves from one cell to another; grid structure update events in case the grid structure is changed for some reason; grid sampling frequency update events in case the sampling frequency of one or more cells of the grid gets changed (e.g., because of different application needs); or sensor constraint update events in case a sensor constraint changes or a sensor value exceeds a constraint threshold value.

The selection trigger for a subset of cells of the grid may be received 4200 by the respective component of the computer system. For example, it may be received by the data processing, grid management or sensor selection components dependent on which component implements the appropriate functionality. One or more of the cells 2004 of the subset have at least one sensor S1, S3, S4 assigned. Further, the one or more cells 2004 have a sampling frequency CSF4 associated.

The participation of sensor nodes in a sensing task may depend on certain constraints. For example, an energy budget constraint may require that only sensors are to be selected which have a remaining energy budget above a certain threshold. A mobility constraint may require that only static sensors or only mobile sensors are supposed to participate. A spatial constraint may require that only sensors in a specific area are supposed to participate. A network communication constraint may require a minimum bandwidth availability for communication between the computer system and the respective sensor network. Other constraints can be possible.

The sensor selection component can select a sensor node by indicating to the sensor node that it is supposed to participate in a specific sensing as a member of a grid cell. The sensor selection component can determine 4300 if a set of constraints is relevant for the selection of one or more sensors S1, S3, S4 to participate in the sensing task and which set of constraints this would be. Then it can select 4400 the one or more sensors S1, S3 if the one or more sensors S1, S3 comply with the set of constraints determined earlier. Thereby, the sensor selection component may prioritize constraints if multiple constraints are specified. It may further determine a set of selected sensors for each constraint and then combine the determined sets by applying set operations such as union or intersection. This can be achieved by using weights that are derived based on the constraint priority and obtaining a final set of selected sensors by a union of all sets. Finally only nodes may be selected in the final set whose weight is above a predefined threshold.

The computer system, for example the data processing component, can then calculate 4500 a sampling frequency of the one or more sensors dependent on the sampling frequency CSF4 of the respective one or more cells, to which the selected sensors are assigned. That is, only sensors are selected which are able to deliver sensor data with the rate specified by the application through the respective cell sampling frequency CSF4. In the case of a single sensor being selected in a cell, the sampling frequency of this single sensor needs to be set to a value corresponding to the sampling frequency of the respective cell. In case of having two or more sensors in the cell being able to participate in the sensing task, the sensor sampling frequencies may be set lower than the cell sampling frequency if the sensors are able to synchronize in a way that the cell sampling frequency can be achieved by using the sensors in an alternating way. For example, if two sensors are assigned to the cell and the cell sampling frequency is set to f, then in one embodiment the sensors can be instructed to provide their sensor data each at a frequency of f/2 by assigning a sequence number 1 or 2, respectively. The sequence number indicates when the respective sensor should send its data. In the example, the first sensor receiving sequence number 1 can send its data immediately after receiving the sampling frequency and sequence number. The second sensor waits the for a time period of 2/f seconds. In total the cell would provide data at the required cell sampling frequency f although both sensors are sampling data only with the sampling frequency f/2. A more accurate cell sampling frequency can be achieved by using an appropriate time synchronization protocol. A person skilled in the art will appreciate that this can be applied for any higher number of sensors in a single cell in an analogous way. Finally each selected sensor is instructed to provide measurement data in compliance with the respective cell sampling frequency, which is required by the application requesting the respective sensing task.

In other words, the method 4000 allows the computer system to select sensors in such a way that they fulfill the spatial requirements as well as the temporal requirements. No use of models is required. Instead a grid with appropriate cell sampling frequencies and respective sensor to cell mappings is used, which allow sensor selection with much lower computational efforts than would be required in model based approaches.

In the following specific optional embodiments of the invention are described.

Figure 5:
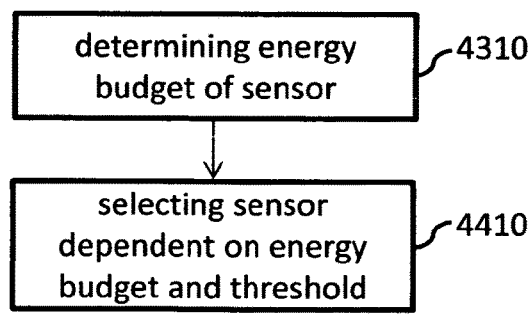
FIG. 5 is a simplified flow chart of an embodiment of the computer implemented method for handling energy constraints.

FIG. 5 is a simplified flow chart of an embodiment of the computer implemented method 4000 for handling energy constraints. The flow chart details the determining 4300 and selecting 4400 of the computer implemented method 4000. For example, a specific measurement task of an application may not allow participating sensors to stop participation in the course of the sensing task because they may run out of energy. This corresponds to a constraint condition for participating sensors. In the example, an energy budget for each sensor node in the respective cell can be determined 4310, for example by the node management component. Then, the sampling frequency for the current cell can be retrieved from the grid management component.

Let us define the following:

Let n be the number of sensors that measure in the respective cell the phenomenon specified in the sensing task Let f be the cell sampling frequency for the respective cell Let e (s) be the remaining energy budget for a sensor node s Let $e_T$ (s) be an energy threshold for a sensor node s Let m<n be the number of selected nodes in the respective cell Without loss of generality let every sensor node have exactly one sensor that can be used to measure the given phenomenon.

According to one embodiment the sensor nodes can be selected 4410 so that if there is at least one sensor node i with $e(i) > e_T(i)$, then all nodes are selected that satisfy this constraint. Otherwise, that is, for all sensors i where $e(i) <= e_T(i)$, choose m=n. The sensor schedule can then be determined by calculating and setting a sampling frequency of f/m for each selected sensor. The method selects the specific sensor nodes based on the sensing task provided by the data processing component. Finally, the calculated sensor sampling frequencies (sensor schedule) are sent to the sensor nodes using the respective gateway of the sensor network where the selected sensor nodes belong to. In the sensor network the respective sensors can be controlled accordingly to adjust their sampling frequencies to the sensor schedule.

Figure 6:
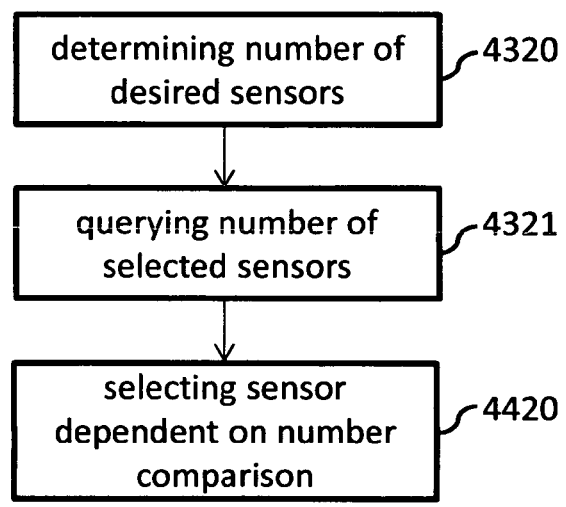
FIG. 6 is a simplified flow chart of an embodiment of the computer implemented method for handling spatial constraints.

FIG. 6 is a simplified flow chart of an embodiment of the computer implemented method 4000 for handling spatial constraints. The flow chart details the determining 4300 and selecting 4400 of the computer implemented method 4000. For example, a specific measurement task of an application may require participating sensors to be located in a certain area. This again corresponds to a constraint condition for participating sensors.

For instance, a spatial location constraint may include a set of triples (p, r, n) where p is a position, r a radius, and n the number of desired sensor nodes that should be selected within a given area, in this example a circle (p, r). In other embodiments polygons may be used for defining a region of interest. Another way of specifying a spatial constraint is a parameter "uniform coverage" that causes to select nodes in the cell so that they uniformly cover a given area. For example, the node management component can determine 4320 that there is a spatial constraint for sensors in a given area and then determine the number of desired sensors in this area. Determining the number of desired sensors can be achieved by applying other constraints such as a number constraint or determining nodes based on an energy budget constraint. Then, for example, the sensor selection component can query 4321 the exact location of already selected sensor nodes and ensure that not only nodes clustered in a sub-region of a cell are selected but rather that the selected 4420 sensor nodes are more evenly spread within the cell. This may be combined with a sensor number constraint. For example, the sensor selection component can compare the number of desired sensor nodes with the number of already selected sensor nodes and select 4420 additional sensors in the given cell for participation in a sensing task for a specific measurement if the number of already selected nodes is below the number of desired sensor nodes. In more general terms, the spatial constraint may indicate the spatial distribution in a region of interest (e.g. coverage) or it may indicate a sub region in which sensor nodes should be selected.

Figure 7:
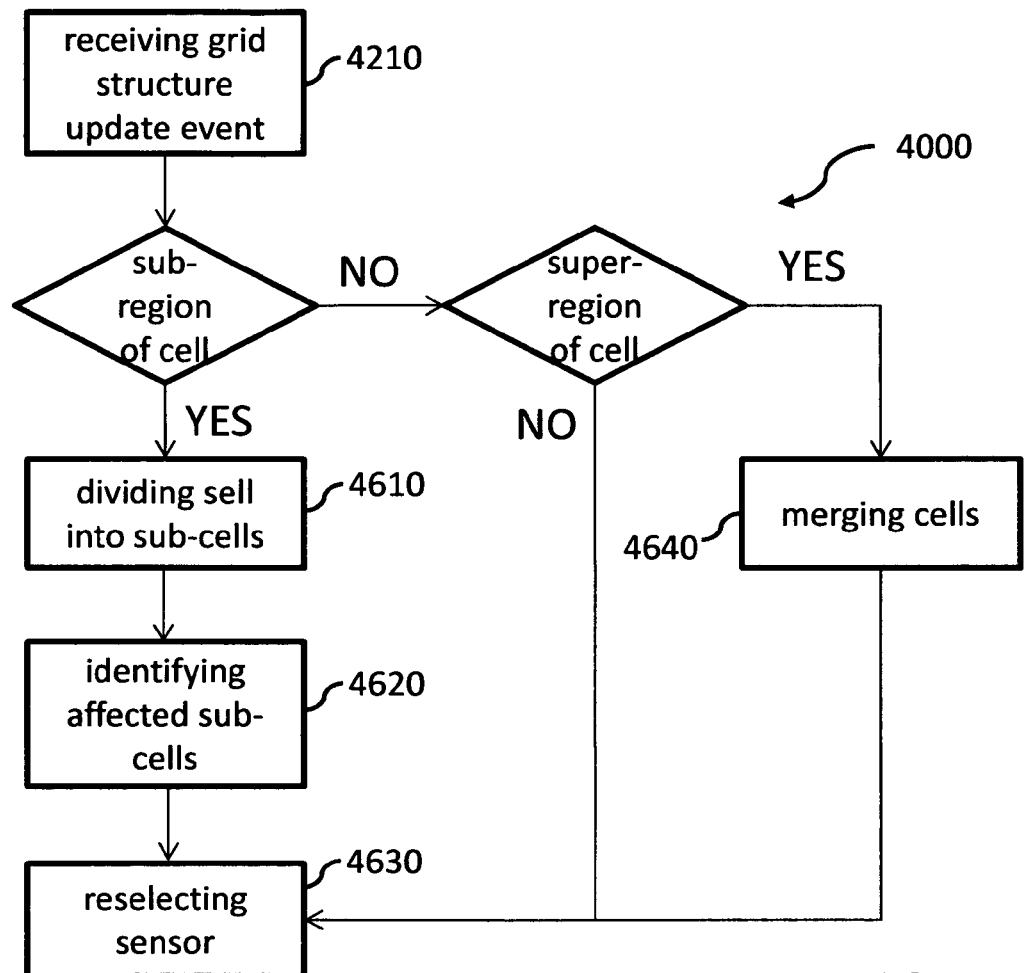
FIGS. 7 and 8 illustrate dynamic adaptation of an irregular grid according to one embodiment of the invention.
Figure 8:
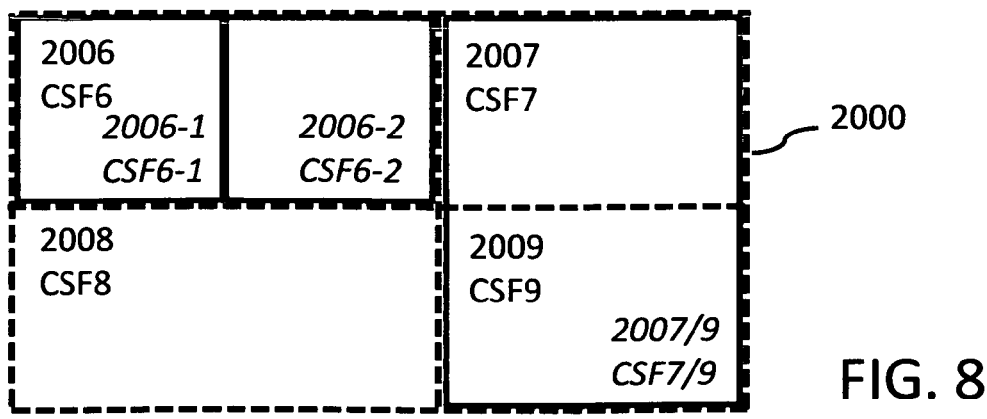

FIGS. 7 and 8 illustrate dynamic adaptation of an irregular grid according to one embodiment of the invention. FIG. 7 is a simplified flowchart of further optional parts of the computer implemented method 4000 in this context and FIG. 8 is a graphical visualization of the respective grid adaptations.

In the example of FIG. 7 sensors are selected when a selection trigger in the form of a grid structure update event is received 4210. The cause for the selection trigger may be a grid structure update performed by a human or as a result of some learning algorithms performed by the data processing component. Whenever the grid structure is adapted over time, the grid management component can launch the grid structure update event to notify the computer system of the change indicating a possible need for sensor reselection. In response to the selection trigger the grid management component can check if the updated portion of the grid is a true sub-region of one or more existing cells.

If this is the case an existing cell can be divided 4610 into sub-cells. Referring now to FIG. 8, the example shows a grid 2000, where the cell 2006 is divided into the sub-cells 2006-1 and 2006-2. The cell sampling frequency CSF6 of the original cell 2006 may be inherited by the new sub-cells but depending on the application needs each sub-cell 2006-1, 2006-2 may also receive its own sampling frequency CSF6-1, CSF6-2, respectively. The grid management component can then identify 4620 which sub-cells are affected by the grid adaptation in terms of sensor reselection. This is possible by referring to the location information of the respective sensors in the grid management component. As mentioned earlier, each sensor can communicate its location data (e.g., GPS data) to the computer system. For example, if two sensors were originally assigned to the cell 2006 and assuming that both sensors have location data in an area which corresponds now to the new sub-cell 2006-1, then sensor reselection would be required for the new sub-cell 2006-1. Finally the sensor selection component can reselect 4630 the two sensors in the affected sub-cell 2006-1 accordingly.

If the updated portion of the grid is not a sub-region of one or more existing cells the grid management component can check if it corresponds to a super-region of existing cells. In the example existing cells 2007, 2009 (cf. FIG. 8) are merged 4640 into a new cell 2007/9. For example, the sampling frequencies CSF7 and CSF8 of the originally existing cells 2007, 2009 may be added to result in the sampling frequency CSF7/9 of the merged cell 2007/9. Adding the cell sampling frequencies can be advantageous in that the rate at which a sensor needs to provide measurement data is hardly decreasing when the cell size of the merged cell and the numbers of sensors in the merged cell are increasing. For example, there can be two sensors in each of the cells 2007 and 2009. For both cells the cell sampling frequencies CSF7, CSF9 equal 1 Hz. That is, in each cell each sensor is instructed to send data every two seconds. The merged cell 2007/9 may now include all four sensors. The added cell sampling frequency CSF7/9 equals 2 Hz. Under the merged setting still each sensor is instructed to send its data every two seconds. Other algorithms for determining the sampling frequency of a merged cell may be used if appropriate. For example, a minimum, a maximum or a weighted average depending on the number of sensors may be applicable for specific sensing tasks. After the grid 2000 has been updated the sensor nodes that are located in updated cell 2007/9 are then reselected 4630 accordingly by the sensor selection component. The updated portion of the grid may neither be a sub-region nor a super-region of the existing cells. This may be the case when the grid is changed in such a way that a cell intersects with multiple cells. For example, two neighbouring equally sized cells can be changed to three equally sized cells. Cells changing their size can keep their cell sampling frequencies. New cells that intersect with previous cells can obtain their new cell sampling frequencies as in the merging case, e.g. by adding the cell sampling frequencies of the previous cells.

Figure 9:
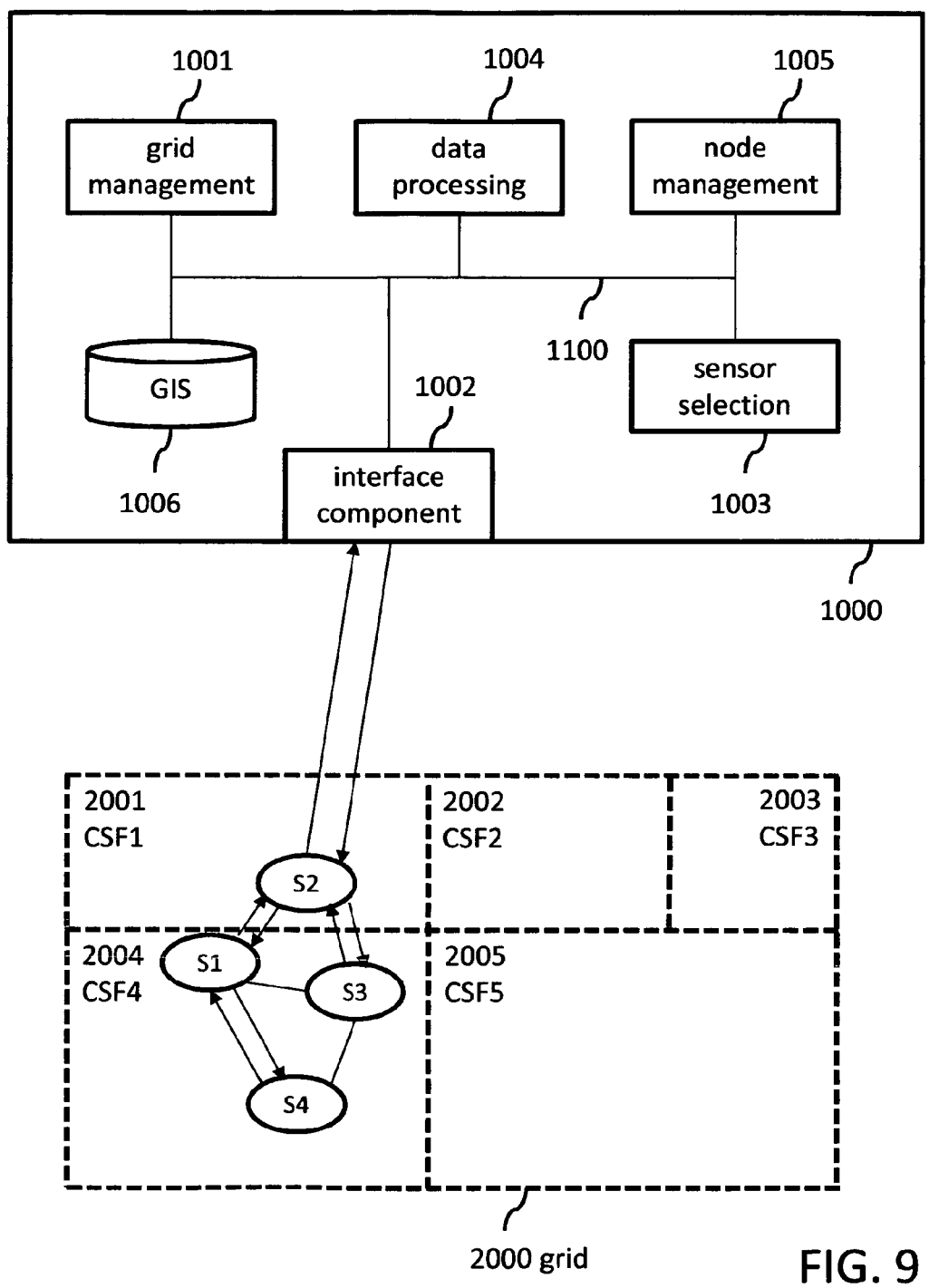
FIG. 9 shows the simplified computer system of FIG. 1 during initialization.

FIG. 9 shows the simplified computer system of FIG. 1 during initialization. When the computer system 1000 is initialized one sensor is added after the other. The example shows how the sensors S1 to S4 are attached to the first sensor network and registered by the computer system 1000. Arrows pointing from the sensors to the computer system indicate data flow from the sensors to the computer system. Arrows pointing from the computer system to the sensors indicate data flow back to the sensor network. The first sensor which is attached to the sensor network is advantageously the gateway node S2 of the first sensor network. During attachment the sensor can provide its location and relevant constraints to the location management function of the computer system. The grid management component 1001 will then create the respective sensor-cell-mapping information and may send back to the sensor S2 the communication endpoint of a location server managing the cell 2001, which is the cell covering the location of gateway sensor S2. After the gateway initialization the remaining sensors S1, S3 and S4 can be added. In the example, S1 sends its respective location and constraint information through the gateway S2 to the computer system and receives back the communication endpoint of a location server managing the cell 2004, which is the cell covering the location of sensor S1. Sensor S3 can also communicate with the computer system directly through the gateway. It could also communicate through S1 to the gateway because it has a direct link established to S1. In the example, S4 has no direct link with the gateway S2 and therefore communicates either through S1 with the gates (as shown in the figure) or alternatively it may also communicate through S3. At the end of the initialization each sensor node is registered with its location data and constraints by the grid management component and knows the communication endpoint of a location server managing its cell respective cell (e.g., CSF1 for S2; CSF4 for S1, S3 and S4). The initial location data provided by the sensor node triggers a selection of the cell where the sensor node is located.

After this initialization, sensor nodes may only send updates of their location to the computer system 1000 if they leave a cell. In this case, if applicable, the respective sensor receives back a communication endpoint for a new location server managing the cell into which the sensor has moved. The updated location data provided by a sensor trigger a reselection of the cell to which the sensor has moved. In one embodiment a sensor node may send regularly its location information to the computer system 1000, which can be advantageous in that no cell information needs to be stored at the sensor node. Sensor nodes may also send updates of their status and of their dynamic constraints such as their remaining energy budget, even if they do not leave the cell. This can happen at regular intervals or on request of the node management component, e.g., when a selection trigger is launched.

Embodiments of the invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program of claim 10, can be written in any form of programming language, including compiled or interpreted languages, and it can be deployed in any form, including as a standalone program or as a module, component, subroutine, or other unit suitable for use in a computing environment. A computer program can be deployed to be executed on one computer or on multiple computers at one site or distributed across multiple sites and interconnected by a communication network. The methods described under FIGS. 4 to 7 can all be executed by corresponding computer products on the respective devices, e.g., the non-trusted server, data producer client computers and the data consumer client computers.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computing device. Generally, a processor will receive instructions and data from a read-only memory or a random access memory or both. The essential elements of a computer are at least one processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Such storage devices may also provisioned on demand and be accessible through the Internet (Cloud Computing). Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the invention can be implemented on a computer having a display device, e.g., a cathode ray tube (CRT) or liquid crystal display (LCD) monitor, for displaying information to the user and an input device such as a keyboard, touchscreen or touchpad, a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of such back-end, middleware, or front-end components. Client computers can also be mobile devices, such as smartphones, tablet PCs or any other handheld computing device. The components of the system can be interconnected by any form or medium of digital data communication, e.g., a communication network. Examples of communication networks include a local area network (LAN) and a wide area network (WAN), e.g., the Internet or wireless LAN or telecommunication networks.

The computing system can include clients and servers. A client and server are generally remote from each other and typically interact through a communication network. The relationship of client and server arises by virtue of computer programs running on the respective computers and having a client-server relationship to each other.

The invention claimed is:

1. A computer implemented method comprising:
   dividing a two-dimensional area into cells, wherein the cells are arranged in a grid;
   receiving a selection trigger for a subset of cells of the grid, wherein at least one cell of the subset has at least one sensor and the at least one cell has a sampling frequency associated;
   determining a set of constraints for the at least one sensor;
   selecting the at least one sensor if the at least one sensor complies with the set of constraints; and
   calculating a sampling frequency of the at least one sensor dependent on the sampling frequency of the at least one cell, such that at least one sensor is instructed to provide measurement data in compliance with the respective cell sampling frequency and in total the cell provides data at the required cell sampling frequency.

2. The computer implemented method of claim 1, wherein the grid is an adaptable, irregular grid.

3. The computer implemented method of claim 1, wherein the selection trigger is selected from a group consisting of:
   a sensor data request,
   a sensor location update event,
   a grid structure update event,
   a grid sampling frequency update event, and
   a sensor constraint update event.

4. The computer implemented method of claim 1, wherein a constraint of the set of constraints is selected from a group consisting of:
   an energy budget constraint,
   an energy threshold constraint,
   a mobility constraint,
   a spatial constraint, a sensor number constraint; and
   a network communication constraint.

5. The computer implemented method of claim 1, wherein the determining a set of constraints further comprises:
   determining at least one spatial constraint for the at least one sensor, wherein the spatial constraint indicates the spatial distribution in a given area or wherein the spatial constraint indicates a sub region in which sensor nodes are to be selected.

6. The computer implemented method of claim 1, wherein the determining a set of constraints and the selecting the at least one sensor further comprise:
   determining at least one energy budget for the at least one sensor, respectively; and selecting the at least one sensor for participation in a specific measurement if the at least one energy budget is greater than a predefined energy threshold.

7. The computer implemented method of claim 2, further comprising:
   receiving a grid structure update event;
   adapting the grid cells in response to the grid structure update event; and
   reselecting the at least one sensor.

8. The computer implemented method of claim 7, wherein adapting the grid cells comprises merging the at least one cell with at least a further cell.

9. The computer implemented method of claim 7, wherein adapting the grid cell comprises:
   dividing the at least one cell into a first sub-cell and a second sub-cell; and identifying which sub-cell is affected by the grid adaptation.

10. A computer program product that when loaded into a memory of a computing device and executed by at least one processor of the computing device executes the steps of the computer implemented method according to claim 1.

11. A computer system comprising:
   a grid management component configured to divide a two-dimensional area into cells of a grid and to associate at least one cell of the grid with a sampling frequency;
   a sensor selection component configured to determine a set of constraints for at least one sensor, the at least one sensor being assigned to the at least one cell and further configured to select the at least one sensor in response to a selection trigger if the at least one sensor complies with the set of constraints; and
   a data processing component configured to launch the selection trigger if trigger conditions are fulfilled, and to calculate a sampling frequency for the at least one sensor dependent on the sampling frequency of the at least one cell, such that at least one sensor is instructed to provide measurement data in compliance with the respective cell sampling frequency and in total the cell provides data at the required cell sampling frequency.

12. The computer system of claim 11, wherein the cells of the grid show an irregular structure.

13. The computer system of claim 11, wherein the grid management component is further configured to merge or divide cells of the grid in response to a grid structure update event.

14. The computer system of claim 11, wherein the grid management component is further configured to modify the sampling frequency of a cell in response to a grid sampling frequency update event.

15. The computer system of claim 11, further comprising:
   a node management component configured to determine at least one energy budget for the at least one sensor, respectively; and
   wherein the sensor selection component is further configured to select the at least one sensor for participation in a specific measurement if the at least one energy budget is greater than a predefined energy threshold.

* * * * *